(12) United States Patent
Iwasaki et al.

(10) Patent No.: US 10,737,835 B2
(45) Date of Patent: Aug. 11, 2020

(54) PLASTIC MOLDED BODY

(71) Applicant: TOYO SEIKAN GROUP HOLDINGS, LTD., Tokyo (JP)

(72) Inventors: Tsutomu Iwasaki, Yokohama (JP); Masaki Aoya, Yokohama (JP); Satoo Kimura, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 356 days.

(21) Appl. No.: 15/518,090

(22) PCT Filed: Oct. 8, 2015

(86) PCT No.: PCT/JP2015/078605
§ 371 (c)(1),
(2) Date: Apr. 10, 2017

(87) PCT Pub. No.: WO2016/067875
PCT Pub. Date: May 6, 2016

(65) Prior Publication Data
US 2018/0257817 A1      Sep. 13, 2018

(30) Foreign Application Priority Data

Oct. 29, 2014 (JP) .................................. 2014-220663

(51) Int. Cl.
*B65D 23/06* (2006.01)
*B65D 25/34* (2006.01)
(Continued)

(52) U.S. Cl.
CPC ............ *B65D 23/06* (2013.01); *B29C 59/022* (2013.01); *B29C 59/14* (2013.01); *B65D 23/02* (2013.01);
(Continued)

(58) Field of Classification Search
CPC ... C08J 7/00; C08J 7/123; C08J 7/126; B65D 23/02; B65D 23/04; B65D 23/06;
(Continued)

(56) References Cited

U.S. PATENT DOCUMENTS 5,324,566 A * 6/1994 Ogawa .................. B05D 1/185
428/141
2013/0235120 A1   9/2013 Hirabayashi et al.
(Continued)

FOREIGN PATENT DOCUMENTS

CN     102963130 A     3/2013
JP     63-035632 A     2/1988
(Continued)

OTHER PUBLICATIONS

Translation of JPH0854006. (Year: 1996).*
Translation of JP2010-174079. (Year: 2010).*
Translation of JP 3487888 (also JPH07197017A). (Year: 2004).*
International Search Report of PCT/JP2015/078605, dated Dec. 22, 2015 (PCT/ISA/210).
(Continued)

*Primary Examiner* — Catherine A. Simone
(74) *Attorney, Agent, or Firm* — Sughrue Mion, PLLC

(57) ABSTRACT

A plastic molded body has a surface including a non-fluororesin and a rough surface formed on the surface, in which a fluorine atom is incorporated into the molecular chain of a non-fluororesin forming the rough surface. The molded body maintains excellent liquid repellency for a long period of time and exhibits the same levels of drainage and liquid drop-off properties as the initial levels even when it is brought into contact with a liquid repeatedly.

7 Claims, 4 Drawing Sheets

(51) Int. Cl.
*B65D 23/02* (2006.01)
*B65D 47/08* (2006.01)
*B65D 47/40* (2006.01)
*B29C 59/02* (2006.01)
*B29C 59/14* (2006.01)
*C08J 7/12* (2006.01)
*B29K 23/00* (2006.01)
*B29L 31/00* (2006.01)

(52) U.S. Cl.
CPC ......... *B65D 25/34* (2013.01); *B65D 47/0838* (2013.01); *B65D 47/40* (2013.01); *C08J 7/123* (2013.01); *C08J 7/126* (2013.01); *B29C 2059/023* (2013.01); *B29K 2023/0633* (2013.01); *B29K 2995/0093* (2013.01); *B29L 2031/7158* (2013.01); *C08J 2323/28* (2013.01)

(58) Field of Classification Search
CPC ...... B65D 23/065; B65D 25/40; B65D 25/42; B65D 47/40; B65D 25/34; Y10T 428/24479
USPC .......................... 428/156, 167, 141, 421, 422
See application file for complete search history.

(56) References Cited

U.S. PATENT DOCUMENTS

2014/0332570 A1  11/2014  Akutsu et al.
2015/0314554 A1  11/2015  Fujiwara et al.

FOREIGN PATENT DOCUMENTS

| | | |
|---|---|---|
| JP | 8-054006 A | 2/1996 |
| JP | 3358131 B2 | 12/2002 |
| JP | 3487888 B2 | 1/2004 |
| JP | 2010-174079 A | 8/2010 |
| JP | 2014-065175 A | 4/2014 |
| KR | 10-2012-0067448 A | 6/2012 |
| WO | 2013/077380 A1 | 5/2013 |
| WO | 2014/087695 A1 | 6/2014 |

OTHER PUBLICATIONS

Communication dated May 30, 2018 from the European Patent Office in counterpart Application No. 15854211.8.
Communication dated Aug. 1, 2019, from the State Intellectual Property Office of the P.R.C in corresponding Chinese Patent Application No. 201580059189.4.

* cited by examiner

CASSIE MODE

WENZEL MODE

PLASTIC MOLDED BODY

CROSS REFERENCE TO RELATED APPLICATIONS

This application is a National Stage of International Application No. PCT/JP2015/078605 filed Oct. 8, 2015, claiming priority based on Japanese Patent Application No. 2014-220663, filed Oct. 29, 2014, the contents of all of which are incorporated herein by reference in their entirety.

TECHNICAL FIELD

The present invention relates to a plastic molded body having a surface comprising a non-fluororesin.

BACKGROUND ART

Since plastics are generally molded easily as compared with glass and metals and can be easily molded into various shapes, they are used for various purposes. Among them, the package field of containers such as bottles and caps attached to containers is the typical application field of plastics.

By the way, when a liquid is contained in the above container, there is always a dripping problem and a device which prevents the liquid from dripping along the outer wall of the mouth portion of the container when the liquid contained in the container is poured out from the mouth portion is required.

According to the type of the liquid in contact with the surface of the container, there is also a liquid adhesion problem. For example, in a container for containing a highly viscous liquid, the liquid adheres to the inner wall of the container, thereby causing a problem with the dischargeability of the liquid from the container. That is, even when the container is inclined, the liquid is not discharged smoothly (low drop-off properties) or it is difficult to discharge all the amount of the liquid in the container, whereby a considerable amount of the liquid remains in the container. Therefore, means for suppressing liquid adhesion to the surface is required.

To prevent liquid dripping and liquid adhesion, liquid repellency should be provided to enhance slipping properties for a liquid on the surface of a plastic molded body, and it is conceivable that to improve liquid repellency, a fluorine-containing resin such as polytetrafluoroethylene is used as a plastic. However, as the fluorine-containing resin is very expensive and difficult to be molded, its use is greatly limited. Therefore, it is desired that the liquid repellency of a plastic molded body formed by using a non-fluororesin containing no fluorine such as a polyolefin or polyester should be improved.

In general, to improve liquid repellency, means for forming a liquid repellent film on the surface and means for forming irregularities on the surface are typical, and means combining them has recently been proposed.

That is, means for forming a liquid repellent thin film (for example, a film comprising a compound or resin containing fluorine or silicon) on the surface is to prevent liquid dripping or liquid adhesion by making a liquid repellent substance existent on the surface. In this means, there is limitation to liquid repellency, for example, liquid repellency is not satisfactory in terms of improving slipping properties for a liquid so that liquid dripping cannot be effectively prevented or the liquid drop-off properties are not fully enhanced. Since it is difficult to form a film which is uniform in thickness, liquid repellency is apt to vary.

The means for forming irregularities on the surface is to physically provide liquid repellency by surface shape. That is, when a liquid flows over an irregular surface, airs pockets are formed in concave portions, the contact state between the irregular surface and the liquid becomes solid-liquid contact and gas-liquid contact, and a gas (air) is a most hydrophobic substance. Therefore, by suitably setting the crude density of irregularities, extremely high liquid repellency is developed, thereby making it possible to improve drainability, prevent liquid dripping effectively and further improve liquid drop-off properties effectively. However, even in this means, when the liquid flows over the irregular surface repeatedly, the liquid gradually accumulates in the concave portions, and air pockets are gradually lost with the result that drainability and liquid drop-off properties gradually deteriorate.

In recent years, technology which combines the above means for making a liquid repellent substance existent on the surface and the above means for forming irregularities on the surface has been proposed. That is, the technology aims to effectively avoid inconvenience that the liquid accumulates in the concave portions by making the liquid repellent substance existent on a surface having irregularities, thereby maintaining liquid repellency for a long period of time.

For example, Patent Document 1 proposes the production of a water- and oil-repellent film by forming an inorganic hard film such as a silicon oxide film on the surface of a plastic film, making fine irregularities on this surface and forming a chemisorption monomolecular film containing fluorine on the irregular surface by using a compound containing a hydrocarbon fluoride group and a chlorosilyl group.

Patent Document 2 proposes a water- and oil-repellent resin molded body having fine irregularities on the surface of a resin molded body containing a fluoroalkyl-based surfactant having water- and oil-repellency.

However, even the above Patent Documents 1 and 2 do not succeed in maintaining drainability and liquid drop-off properties stably.

For example, in Patent Document 1, the chemisorption monomolecular film containing fluorine is gradually removed by bringing it into contact with a liquid repeatedly, whereby the liquid gradually accumulates in the concave portions, thereby gradually losing drainability and liquid drop-off properties.

In Patent Document 2, since the fluoroalkyl-based surfactant bleeds out onto the surface, water repellency and liquid repellency are developed. However, when the liquid is brought into contact with the surface repeatedly, the bleeding fluoroalkyl-based surfactant is gradually removed with the result that drainability and liquid drop-off properties gradually deteriorate.

Further, the inventors of the present invention previously proposed a plastic molded body having a fractal hierarchical surface irregular structure that primary irregularities are formed on the surface and secondary fine irregularities are formed on at least some of the primary irregularities (JP-A 2013-220998).

As secondary finer irregularities are formed within the area of the primary irregularities in this molded body, the entry of a liquid into the primary irregularities is effectively suppressed, and liquid repellency obtained by the primary irregularities is maintained stably.

However, even this means has limitation to the suppression of the deterioration of drainability and liquid drop-off properties. That is, the entry of the liquid into the secondary irregularities cannot be prevented completely, drainability and liquid drop-off properties obtained by the air pockets formed in the secondary irregularities gradually deteriorate, and therefore the liquid gradually enters the primary irregularities with the result that the deterioration of drainability and liquid drop-off properties cannot be avoided.

Even when the molded body is brought into contact with a liquid repeatedly, drainability and liquid drop-off properties must be maintained stably.

PRIOR ART DOCUMENTS

Patent Documents

Patent Document 1: Japanese Patent No. 3358131
Patent Document 2: JP-A 2014-65175

DISCLOSURE OF THE INVENTION

Problem to Be Solved by the Invention

It is therefore an object of the present invention to provide a plastic molded body which maintains excellent liquid repellency for a long period of time and has a surface exhibiting the same levels of drainability and liquid drop-off properties as the initial levels even when it is brought into contact with a liquid repeatedly.

It is another object of the present invention to provide a plastic molded body having a surface which prevents dripping and liquid adhesion effectively by the above drainability and liquid drop-off properties.

Means for Solving the Problem

According to the present invention, there is provided a plastic molded body having a surface comprising a non-fluororesin and a rough surface formed on the surface, wherein a fluorine atom is incorporated into the molecular chain of a non-fluororesin forming the rough surface.

In the plastic molded body of the present invention, preferably,
(1) the above rough surface has a primary irregular surface and a secondary irregular surface which is finer than the primary irregular surface and formed within the primary irregular surface, and the above fluorine atom is incorporated into the molecular chain of a non-fluororesin forming the secondary irregular surface;
(2) a tertiary finer irregular surface is formed within the secondary irregular surface, and the above fluorine atom is incorporated into the molecular chain of a non-fluororesin forming the tertiary irregular surface;
(3) when a drop of water is dropped on the above rough surface, the area ratio $\phi_s$ represented by the projection area of a solid-liquid interface per unit area is 0.05 to 0.8;
(4) the above rough surface has a rectangular irregular structure;
(5) when the arithmetic average roughness corresponding to the amplitude of the irregular structure forming the above rough surface is represented by Ra and the average length of the ½ pitch ($R_O$) of the irregular structure is represented by RSm, the above rough surface satisfies Ra/RSm≥50×$10^{-3}$;
(6) the above plastic molded body is used as a package material used to contain a liquid substance; and
(7) the above package material has the form of a bottle, cap or spout, and the above rough surface is formed in a part in contact with a liquid substance.

Effect of the Invention

The plastic molded body of the present invention is formed from a non-fluororesin such as a polyolefin or polyester, a rough surface having fine irregularities is formed on the surface, and a fluorine atom is incorporated into the molecular chain of the non-fluororesin forming this rough surface. That is, when a liquid flows over this rough surface (fine irregular surface), the formation (gas-liquid contact) of air pockets by the rough surface and the improvement of liquid repellency by the fluorine atom are combined to ensure high drainability and liquid drop-off properties. However, since this fluorine atom is incorporated into the molecular chain of the non-fluororesin of the surface, it does not drop off from the surface (rough surface) and is existent on the surface (rough surface) stably. Therefore, even when a liquid is let flow repeatedly, stable liquid repellency is obtained.

That is, as shown in Examples which will be described hereinafter, in the plastic molded body of the present invention having the above rough surface, in a test for measuring the contact angle of a liquid (sauce) after the surface was inclined at a predetermined angle)(25° to drop the liquid repeatedly to contaminate the surface, even when dropping was repeated 100 times or more, the contact angle was almost the same as the initial value and liquid repellency was thus maintained. This is because a fluorine atom is incorporated into the molecular chain of the non-fluororesin forming the rough surface, whereby even when the molded body is brought into contact with the liquid repeatedly, the fluorine atom which exhibits liquid repellency is not removed.

For example, in the case of a rough surface as the surface, when this rough surface is treated with a silane coupling agent having a fluorine atom, or when the non-fluororesin forming the surface is mixed with a fluorine-containing surfactant, the fluorine atom-containing component is dropped on the rough surface after the surface is brought into contact with a liquid repeatedly, thereby gradually deteriorating liquid repellency.

Since the plastic molded body of the present invention has a rough surface which maintains liquid repellency stably as described above, this rough surface is formed at a suitable position according to the shape and purpose of the plastic molded body, thereby making it possible to develop stable drainability and to discharge a content liquid without dripping and swiftly without adhering or leaving the content liquid on the wall due to stable water repellency.

The present invention is effectively applied in the package field in which dripping, adhesion, retention and dischargeability (drop-off properties) at the time of discharging a content liquid become big problems, for example, caps, spouts or package materials such as containers including bottles.

BEST MODE FOR CARRYING OUT THE INVENTION

Figure 1:
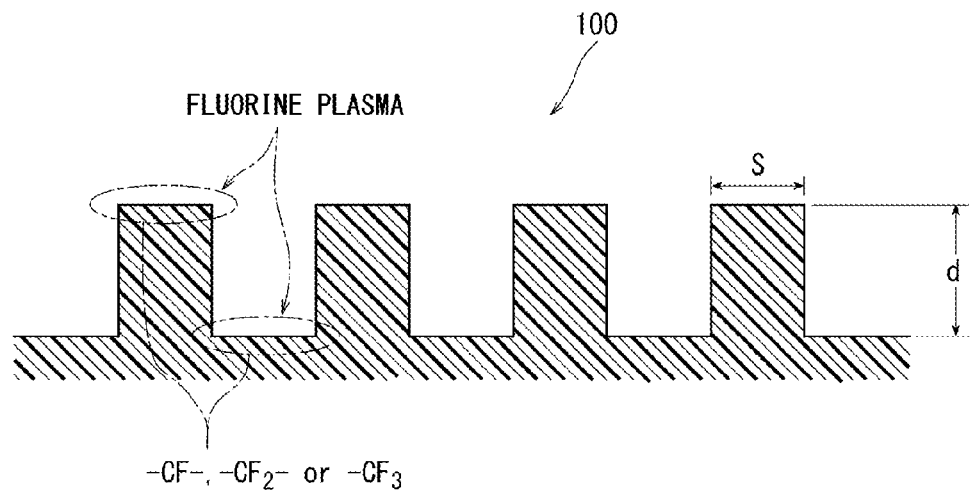
FIG. 1 is a diagram showing the form of a liquid repellent rough surface formed in the plastic molded body of the present invention.

In FIG. 1 which shows the form of a rough surface formed on the surface of the plastic molded body of the present invention, this surface is formed from a non-fluororesin, a rough surface 100 having fine irregularities is formed on this surface (in FIG. 1, the top of each convex portion of the rough surface 100 is represented by S), and a fluorine atom is incorporated into the molecular chain of the non-fluororesin forming this rough surface 100 by post-processing. For example, when the molecular chain of the non-fluororesin is represented by —($CH_2$)n-, the fluorine atom is incorporated into part of this molecular chain to form a fluorine-containing part such as —CHF—, —$CF_2$— or —$CF_3$. The post-processing for incorporating the fluorine atom is carried out by fluorine plasma etching which will be described hereinafter.

The liquid repellency of a liquid on the above rough surface 100 will be described with reference to FIG. 2.

Figure 2:
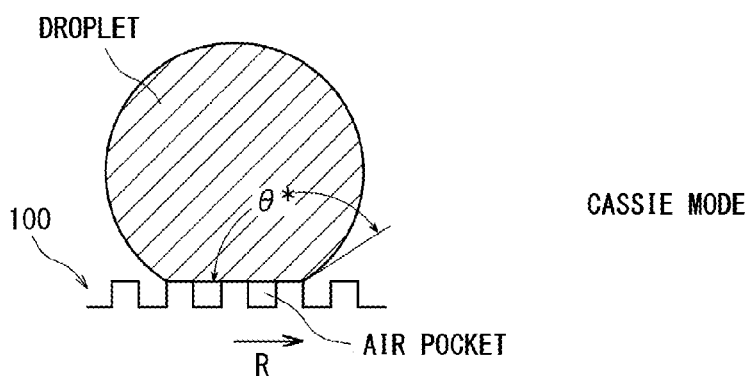
FIG. 2 is schematic diagrams of droplet contact patterns on the rough surface expressed by a Cassie-Baxter model and a Wenzel model.
Figure 2:
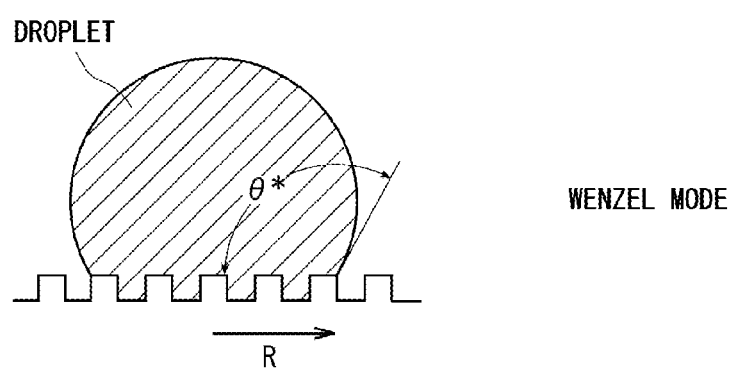

That is, in FIG. 2 which shows droplet contact patterns on the above rough surface 100, in a Cassie mode in which a droplet is situated on the rough surface 100, concave portions in the rough surface 100 become air pockets, and the droplet comes into composite contact with a solid and a gas (air). That is, in this composite contact, the radius R at the contact interface of the droplet is small and the liquid comes into contact with air having highest hydrophobicity, thereby developing high water repellency.

The theoretical formula (1) of the contact angle of the rough surface 100 in the Cassie mode is given below.

$$\cos\theta^* = (1 - \phi_s)\cos\pi + \phi_s\cos\theta_E \quad (1)$$

$$= \phi_s - 1 + \phi_s\cos\theta_E$$

$\theta_E$: contact angle
$\theta^*$: apparent contact angle
$\phi_s$: area ratio (projection area of solid-liquid interface per unit area)

As understood from this theoretical formula, as $\phi_s$ becomes smaller, the apparent contact angle $\theta^*$ becomes closer to 180° to exhibit super liquid repellency.

Meanwhile, when a droplet enters concave portions in a rough surface 1a, the droplet is not in composite contact but in contact only with a solid, which is represented by a Wenzel mode. In this Wenzel mode, the contact radius R at the contact interface of the droplet is large, and the theoretical formula (2) of the contact angle of the irregular surface is given below.

$$\cos\theta^* = r\cos\theta_E \quad (2)$$

$\theta_E$: contact angle
$\theta^*$: apparent contact angle

R: irregularity degree (actual contact area/projection area of droplet)

As understood from this theoretical formula, as "r" becomes larger, the apparent contact angle $\theta^*$ becomes closer to 180° to exhibit super liquid repellency.

Although it is known that liquid repellency is improved in both the Wenzel mode and the Cassie mode as described above, to improve drop-off properties and repeated drop-off properties, not the Wenzel mode but the Cassie mode is maintained stably. That is, the inventors of the present invention think that it is necessary to maintain the air pockets in the concave portions stably. That is, the interface between a liquid phase and a solid phase is large in the Wenzel mode with the result that physical adsorption force applied to the interface is large, whereby the contact angle is large to repel a liquid but a droplet does not easily drop off. It is considered that since the interface is small in the Cassie mode, an energy barrier which must be overcome when a droplet drops off is so low that the droplet drops off easily and repeatedly.

In the present invention, liquid repellency is chemically provided by incorporating a fluorine atom into the molecular chain of the non-fluororesin forming the rough surface 100 in order to effectively keep the contact of a droplet in the above Cassie mode. That is, when the liquid enters the concave portions in the rough surface 100, the contact pattern of the droplet becomes the Wenzel mode with the result that super liquid repellency in the Cassie mode is impaired. In the present invention, since liquid repellency is chemically provided to this rough surface 1a by incorporating a fluorine atom into the molecular chain, the entry of the liquid into the concave portions is effectively suppressed, thereby maintaining super liquid repellency in the Cassie mode stably.

In addition, in the present invention, in at least part of the rough surface 100, for example, the tops of the convex portions or the bottoms of the concave portions, a fluorine atom for developing chemical liquid repellency is incorporated into the molecular chain of the non-fluororesin forming this surface. Therefore, even when the liquid comes into contact with this rough surface 100 repeatedly, the fluorine atom is not removed and chemical liquid repellency is maintained stably with the result that super liquid repellency in the Cassie mode is not degraded and is maintained at the same high level as the initial level. Making use of this, excellent drainability (dripping prevention) and liquid drop-off properties (liquid dischargibility) can be maintained for a long period of time.

Further, since a film containing a fluorine atom is not formed but a fluorine atom is incorporated into the molecular chain of the non-fluororesin of the surface, the control of film thickness is not necessary and there are no variations in liquid repellency according to film thickness.

As for the irregularity degree of the above rough surface 100, to fully develop liquid repellency in the Cassie mode, the area ratio $\theta_s$ represented by the area of the top "S" of the convex portion per unit area in the rough surface 100 is not less than 0.05, preferably not less than 0.08 and not more than 0.8, particularly preferably not more than 0.5 from the viewpoints of moldability and mechanical strength. For example, when a droplet is dropped on the rough surface 100, the area ratio $\phi_s$ represented by the projection area of a solid-liquid interface per unit area is preferably 0.05 to 0.8, more preferably 0.08 to 0.5 so that the Cassie mode is preferably maintained stably.

The depth "d" in the rough surface 100 is preferably 5 to 200 μm, particularly preferably 10 to 50 μm.

Figure 8:
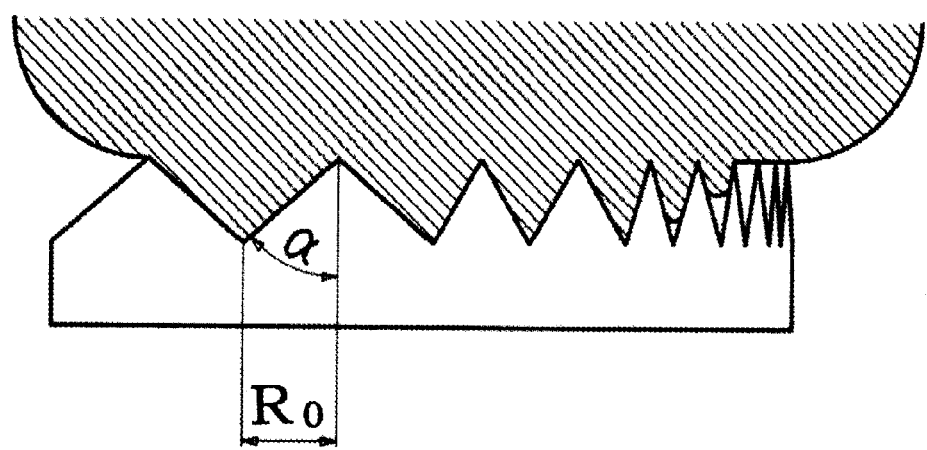
FIG. 8 is a diagram showing the form of a rough surface formed in the present invention.

The rough surface 100 may have an irregular structure shown in FIG. 8.

That is, a droplet is supported by a Laplace pressure ($\Delta p$) represented by the irregular point angle $\alpha$ and the ½ pitch $R_0$ of irregularities according to the formula (3) to form an air pocket. That is, when the irregular point angle $\alpha$ becomes small, the ½ pitch $R_0$ becomes small and the irregular structure becomes like a frog, the Laplace pressure becomes so large that a droplet hardly enter irregularities, thereby developing liquid repellency.

Therefore, as understood from FIG. 8, when the arithmetic average roughness Ra representing the amplitude of the irregular structure is large and the average length RSm corresponding to the ½ pitch $R_0$ is small, the Laplace pressure becomes large, thereby developing liquid repellency. Therefore, Ra/RSm is preferably not less than $50\times10^{-3}$, particularly preferably not less than $200\times10^{-3}$.

$$\Delta p = -\gamma \cos(\theta-\alpha)/(R_0 + h\cos\alpha) \quad (3)$$

In the present invention, the rough surface 100 which has the above fine irregularities can be easily formed by a transfer method using a metal stamper. That is, a stamper having a rough surface part corresponding to the above fine irregularities obtained by a resist method is heated at a suitable temperature and pressed against a predetermined part of the surface of a plastic molded body to transfer the rough surface part, thereby making it possible to form the above rough surface 100 on the surface of the plastic molded body. Therefore, the irregular surface of the stamper is formed on the surface 1 of the plastic molded body in such a manner that the irregularities are reversed.

In FIG. 1, the concave and convex shapes of the rough surface 100 are not particularly limited but concave portions and convex portions are preferably formed rectangular as shown in FIG. 1 so as to form air pockets stably. For example, when the concave portions are V-shaped, droplets easily enter the concave portions.

Further, incorporation into the molecular chain of the non-fluororesin forming the surface is carried out by etching using fluorine plasma.

This fluorine plasma etching may be carried out by a method known per se. For example, a $CF_4$ gas or $SiF_4$ gas is used, the surface of a plastic molded body on which the rough surface 100 is to be formed is arranged between a pair of electrodes, and a high-frequency electric field is applied to produce fluorine atom plasma (atomic fluorine) which is then collided with apart for forming the rough surface 100, whereby the fluorine atom is incorporated into the molecular chain of the non-fluororesin forming the surface (rough surface 1a). That is, the resin of the surface is gasified or decomposed and the fluorine atom is incorporated at the same time.

Therefore, super fine irregularities are formed by etching in an area where the fluorine atom is incorporated. The arithmetic average roughness Ra of the super fine irregularities is generally not more than 100 nm and Ra/RSm $5\times10^{-3}$.

Conditions such as the high-frequency voltage to be applied and the etching time are set to suitable ranges according to the roughness (area ratio $\phi_s$) of the rough surface 100. For example, in a liquid repellent durability test which is carried out in Examples to be described hereinafter, when the contact angle is measured after a droplet (sauce) is dropped 100 times, a contact angle which is not less than 90% of the initial contact angle should be obtained. The conditions under which this contact angle is obtained should be set by a preliminary laboratory test. Depending on the roughness of the rough surface 100, in general, when the element ratio (F/C) of a fluorine atom and a carbon atom per unit area is not less than 40%, specifically 50 to 300%, stable super high liquid repellency like the above liquid repellency can be secured without impairing surface strength. The element ratio can be calculated by analyzing the elemental composition of the surface with an X-ray photoelectron spectroscope.

In the above-described present invention, the rough surface 100 is not limited to those shown in FIG. 1 and FIG. 8 and is preferably formed with a fractal hierarchical structure.

Figure 3:
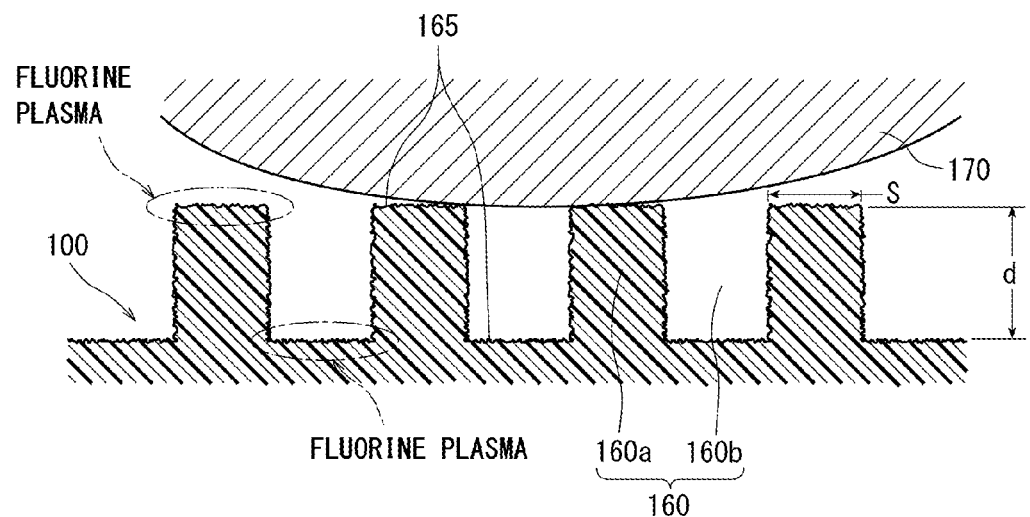
FIG. 3 is an enlarged view of the form of the most preferred rough surface formed in the plastic molded body of the present invention.

For example, as shown in FIG. 3, it is preferred that secondary fine irregularities 165 should be formed on the primary irregularities 160 consisting of relatively large convex portions 160a and concave portions 160b. That is, since a droplet 170 is mounted on the secondary irregularities 165, air pockets (secondary air pockets) are formed between the droplet 170 and the secondary irregularities 165. That is, the secondary air pockets between the droplet 170 and the secondary irregularities 165 prevent entry into the concave portions 160b of the primary irregularities 160, thereby making it possible to prevent the elimination of the air pockets formed between the primary irregularities 160 and the droplet 170 more effectively, to keep the Cassie mode state more stably and to maintain drop-off properties and drainability (dripping prevention properties) more stably.

On the rough surface 100 having this hierarchical structure, the secondary irregularities 165 on the surface of the primary irregularities 160 should have a surface roughness that ensures the formation of the secondary air pockets which prevent a droplet on the secondary irregularities 165 from entering the concave portions 160b of the primary irregularities 160. For example, the ratio Ra/RSm of the arithmetic average roughness and the average length is preferably not less than $50\times10^{-3}$, particularly preferably not less than $200\times10^{-3}$.

The above primary irregularities 160 should have the same area ratio $\phi$ and the same depth "d" of the irregularities as those of the rough surface 100 shown in FIG. 1, thereby fully developing liquid repellency in the Cassie mode.

Although the second irregularities 165 are most preferably formed on the entire surface of the primary irregularities 160 from the viewpoint of preventing the droplet 170 from entering the concave portions 160b of the primary irregularities 160 more effectively, they should be formed at the upper ends of at least the convex portions 160a of the primary irregularities 160.

The rough surface 100 having the above hierarchical structure can be formed by forming a fine secondary irregular surface on the irregular surface of a stamper for forming primary irregularities by blasting and transferring the fine secondary irregular surface by using the stamper.

In the present invention, in at least part of an area on the primary irregularities 160 on which the secondary irregularities 165 have been formed as described above, specifically, portions which become the tops of the convex portions 160a of the primary irregularities 160 and portions which become the bottom portions of the concave portions 160b, a fluorine atom is incorporated into the molecular chain of the non-fluororesin forming the surface by fluorine plasma etching. In that area, tertiary irregularities which are finer than the secondary irregularities are formed by etching at the time of incorporating the fluorine atom. The arithmetic average roughness Ra of the tertiary irregularities is not more than 100 nm like the super fine irregularities formed by the above-described etching and Ra/RSm $5\times10^{-3}$.

In the above-described present invention, although the surface of this plastic molded body is formed by using the non-fluororesin, as this non-fluororesin, that is, a resin containing no fluorine, any thermoplastic resin, thermosetting resin or photocurable resin may be used as long as the rough surface 100 having the above irregularities can be formed and the fluorine atom can be incorporated into the molecular chain by fluorine plasma etching. A suitable resin may be selected according to the purpose of this molded body and may have a multi-layer structure.

In general, in the package field, olefin-based resins typified by polyethylene, polypropylene and a copolymer of ethylene or propylene and another olefin, and polyesters such as polyethylene terephthalate (PET), polyethylene isophthalate and polyethylene naphthalate are typical resins for forming the surface.

The plastic molded body of the present invention may be various in form, making use of the long service life and excellent liquid repellency of the above-described rough surface 100 and can be effectively used as a package for containing drinks, seasoning liquids and drug liquids due to excellent drainability.

Figure 4:
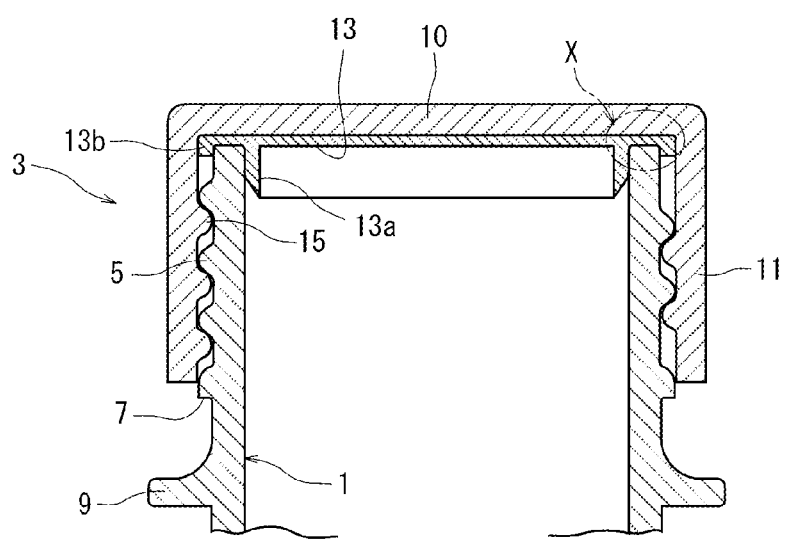
FIG. 4 is a side sectional view of a package (a combination of a bottle and a cap) as an example of the plastic molded body of the present invention.

In FIG. 4 which shows a preferred example of the package, this package includes a plastic bottle having a mouth portion 1 and a cap (screw cap) 3 attached to the mouth portion 1, and a liquid is contained in the plastic bottle.

In this package, although not shown in this plastic bottle, the lower part of the mouth portion 1 is connected to a curved shoulder portion connected to a barrel portion whose lower end is closed by a bottom portion.

In this plastic bottle, a screw thread 5 for holding the cap 3 is formed on the outer surface, an annular projection 7 is formed below the screw thread 5, and a support ring 9 for holding the bottle at the time of transport is formed below the annular projection 7.

Meanwhile, the cap 3 has a top panel portion 10 and a cylindrical side wall 11 extending downward from the periphery of the top panel portion 10, a sealing liner 13 is formed on the inner surface (especially a peripheral portion) of the top panel portion 10, and a screw thread 15 to be mated with the screw thread 5 of the mouth portion 1 of the bottle is formed on the inner surface of the cylindrical side wall 11.

That is, the cap 3 is attached to the mouth portion 1 by screw mating, and the upper part of the mouth portion 1 comes into close contact with the liner 13 when the cap 3 is attached, thereby sealing the inside of the bottle.

To ensure this sealing, the liner 13 has a relatively long inner ring 13a and a relatively short outer ring 13b, the upper end part of the mouth portion 1 enters a space between them, and the inner side face, the upper end face and the outer side face of this upper end part come into close contact with the liner 13 to ensure sealability.

Not shown in FIG. 4, a tamper evident band (TE band) is generally formed at the lower end of the cylindrical side wall 11 of the cap 3 through a breakable weakened line and removed from the cap 3 when the cap 3 is removed from the mouth portion 1 by opening the bottle, thereby clearly showing the opening record of the cap 3 to a general consumer and preventing wrongful use such as a prank.

In the above package, after the cap 3 is removed from the mouth portion 1 of the bottle, a liquid contained in the bottle is poured out from the mouth portion 1 by inclining the bottle. As understood from this, the spout of the package to which the cap 3 (threaded cap) is attached is the upper end face X of the mouth portion 1 of the bottle.

That is, when the plastic molded body of the present invention is applied to this plastic bottle, the above-described irregular surface 100 is formed on the upper end face (may be simply referred to as "spout" hereinafter) X of the mouth portion 1 of the bottle.

Further, although the mouth portion 1 of the bottle is the spout X in the above-described example, the plastic molded body of the present invention may be applied to a cap.

Figure 5:
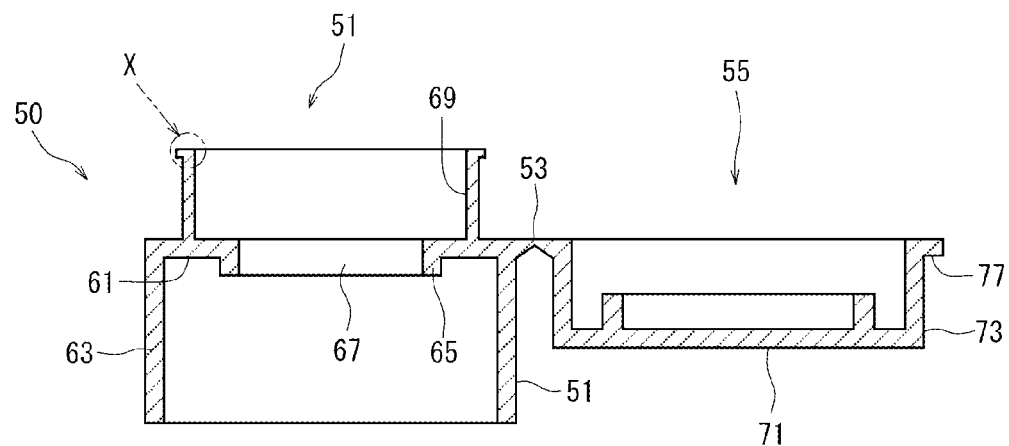
FIG. 5 is a side sectional view of a hinge cap which is another example of the plastic molded body of the present invention.
Figure 6:
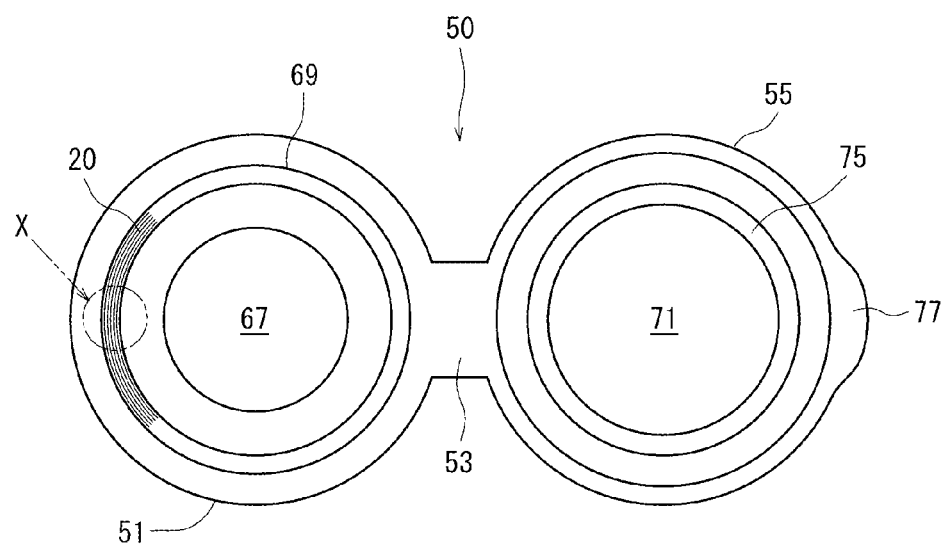
FIG. 6 is a plan view of the hinge cap shown in FIG. 5.

In FIG. 5 and FIG. 6, this hinge cap (50 in these figures) is used by attaching to the mouth portion 1 of the same plastic bottle as the package shown in FIG. 4. In the example of FIG. 4, the cap is referred to as "screw cap" which is attached to the mouth portion 1 by screw mating whereas the cap employed in this example is referred to as "hinge cap".

That is, the cap 50 includes a cap body 51 which is fixed by fitting onto the mouth portion 1 of the bottle and a hinge lid 55 which is hinge connected to the cap body 51 through a hinge band 53.

The cap body 51 includes a top panel 61 and a cylindrical side wall 63 extending downward from the periphery of the top panel 61, and an annular projection 65 extending downward is formed on the inner surface of the top panel 61 with a space between it and the cylindrical side wall 63. That is, the upper part of the bottle mouth portion 1 is fitted in the space between the cylindrical side wall 63 and the annular projection 65 by plugging, whereby the cap body 51 is firmly fixed to the bottle mouth portion 1.

An opening 67 which is a flow channel at the time of pouring out a content liquid is formed in the center part of the top panel 61, and a spouting cylinder 69 is formed upright around the opening 67 on the top surface of the top panel 61.

In general, this opening 67 is closed before it is sold and used after the package is produced, and the wall of this part is peeled off to form the opening 67 when a general consumer pours out the content liquid from the bottle for the first time.

Meanwhile, the hinge lid 55 includes a top panel portion 71 and a skirt portion 73 extending from the periphery of the top panel portion 71, and the end part of the skirt portion 73 is connected to the hinge band 53 which is connected to the upper end of the cylindrical side wall 63 of the cap body 51. The hinge lid 55 is opened and closed by turning with the hinge band 53 as a fulcrum point.

A seal ring 75 is formed on the inner wall (top wall in FIG. 6) of the top panel portion 71 of the hinge lid 55, and a sealing flange 77 is formed at an end part on a side opposite to the hinge band 53 of the top panel portion 71.

That is, when the hinge lid 55 is closed, the outer surface of the seal ring 75 comes into close contact with the inner surface of the spouting cylinder 69, thereby ensuring sealability when the opening 67 for pouring out the content liquid is formed.

The sealing flange 77 is provided to facilitate turning for opening and closing the hinge lid 55.

Since the content liquid is poured out from the spouting cylinder 69 by opening the hinge lid 55 in this hinge cap, the upper end of the spouting cylinder 69 expands a little outward like a trumpet.

The upper end part of this spouting cylinder 69, especially a part on a side opposite to the hinge band 53 is a spout X. That is, since the opened hinge lid 55 is existent on the side where the hinge band 53 is existent, the content liquid is poured out to the side opposite to the side where the hinge band 53 is existent.

As understood from the above explanation, in this hinge cap, the above-described rough surface 100 is formed in a part which becomes at least the spout X of the upper end of the spouting cylinder 69.

The rough surface 100 may extend downward on the inner surface of the spouting cylinder 69, preferably not to a part in close contact with the seal ring 75 of the above-described hinge lid 55. When the rough surface 100 extends up to this part, sealability may deteriorate.

In FIG. 5 and FIG. 6, the hinge lid 55 is used as a member that ensures sealability after the opening 67 is formed. There is a cap having a structure that a screw lid is used in place of the hinge lid 55. That is, the screw lid is attached to the cap body 1 detachably by screw mating. Since all the periphery of the upper end of the spouting cylinder 69 becomes the spout X in this case, the rough surface 100 is formed at all the periphery.

In the above example, a plastic material forming the plastic bottle having the mouth portion 1 is not particularly limited and various thermoplastic resins, for example, olefin-based resins such as polyethylene and polypropylene and polyester resins typified by polyethylene terephthalate (PET) may be used like known plastic bottles. Since the upper end surface of the mouth portion 1 of this bottle becomes the spout X and the rough surface 100 composed of an irregular surface is formed on this part, a polyester resin is most preferred from the viewpoints of the shape stability and strength of the irregular surface 100.

When the irregular surface 100 is formed on the spout X which is on the cap side, this bottle may be made of glass or metal.

Further, a plastic material forming the caps 3 and 50 is not particularly limited and various thermoplastic resins, for example, olefin-based resins such as polyethylene and polypropylene may be used like known plastic caps.

When the rough surface 100 is formed on the spout X which is on the bottle side, this cap may be a screw cap made of metal.

Further, the liner material 13 formed on the cap 3 is formed from a known elastic material, for example, an ethylene-propylene copolymer elastomer or thermoplastic elastomer such as styrene-based elastomer.

To form the above-described rough surface 100 on the spout X of the mouth portion 1 of the above-described bottle or the spouts X of the caps 3 and 50, a predetermined stamper is pressed against this spout X to form predetermined irregularities and then fluorine plasma etching is carried out.

Figure 7:
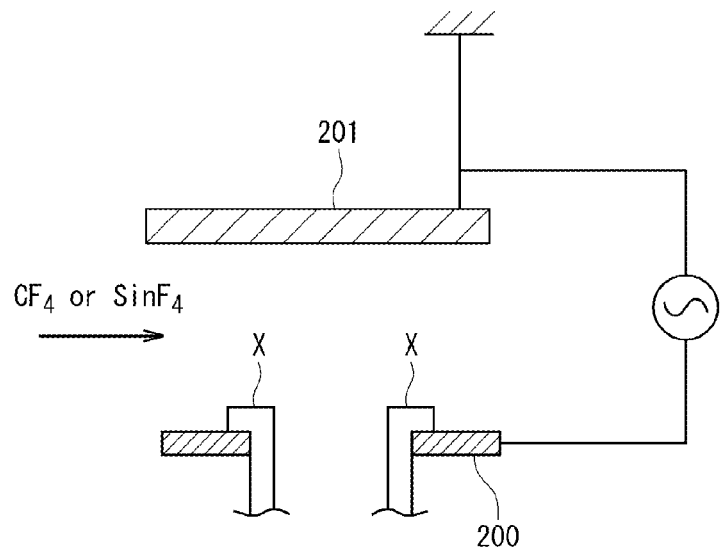
FIG. 7 is a diagram showing a method of a fluorine plasma etching treatment.

As shown in FIG. 7, this plasma etching may be carried out by fixing one electrode 200 to the lower part (upper part of the container mouth portion 1 or the upper part of the spouting cylinder 69) of the spout X, opposing the other electrode 201 to the above electrode 200 in such a manner that the spout X is interposed between these electrodes and applying a high-frequency electric field while a fluorine-containing gas is blown into a space between the electrodes In FIGS. 4 to 6, the plastic molded body of the present invention is applied to the bottles and the caps. The present invention is not limited to these as a matter of course and may be applied to, for example, a spout which is used as a spouting tool and attached to a bag-like container.

Further, to form the rough surface 100 on the above-described bottles and caps, the bottle and the cap are molded by predetermined means in advance and the rough surface 100 is formed at a predetermined site by transfer using the above-described stamper.

The shapes of the irregularities on the rough surface 100 are arbitrary as long as they are designed to ensure that a liquid flows over the irregularities.

Since the plastic molded body of the present invention maintains excellent liquid repellency for a long period of time and has a rough surface which exhibits the same levels of drainability and drop-off properties as the initial levels even when it is brought into contact with a liquid repeatedly, it is effectively applied to a package material such as a cap or container. By forming the above-described rough surface 100 on the spout, it can discharge a liquid without dripping. When the above-described rough surface 100 is formed on the entire inner surface of the container, a viscous paste-like product typified by ketchup or mayonnaise can be discharged smoothly and completely without leaving it in the container.

EXAMPLES

The following examples are provided to explain the excellent characteristic properties of the present invention.
(1) Substrate;
* material: low-density polyethylene
  Grade: LJ8041 (Japan Polyethylene Corporation)
Size: 58 mm (length)×58 mm (width)×3 mm (thickness)
(2) Stamper;
* Production Method
  * Primary irregularity stamper
  A master was produced by photolithography to obtain a stamper having primary irregularities engraved by Ni electroforming.
  Primary irregularities
  $\phi s=0.2$ ($s=20$ μm, $d=30$ μm, pitch=100 μm)
Secondary Irregularity Stamper
  The master produced by Cu electroforming was wet etched to form a rough surface so as to obtain a stamper having secondary irregularities engraved by Ni electroforming.
Secondary Irregularities
$Ra/RSm=264\times10^3$
($Ra=933$ nm, $RSm=3.5$ μm)
  Fractal stamper having primary irregularities+secondary irregularities
  Shot blast was made on the above primary irregularity stamper to obtain a stamper having secondary irregularities engraved on the primary irregularities.
Primary Irregularities
$\phi s=0.2$ ($s=20$ μm, $d=30$ μm, pitch=100 μm)
Secondary Irregularities
$Ra/RSm=92\times10^{-3}$
($Ra=305$ nm, $RSm=3.3$ μm)
(3) Transfer Molding;
  The stamper was heated at 240° C. by infrared radiation heating with a halogen lamp and pressed against the substrate for 1 second and then the substrate was cooled to transfer mold primary irregularities and secondary irregularities.
(4) Carbon Fluoride Plasma Treatment
* Plasma device
  Discharge system: surface wave plasma
  Power source: 1500 W@2.45 GHz
  Treatment conditions
  Degree of vacuum: 4 Pa
  Raw material gas: $CF_4$ 100 sccm
  Plasma irradiation time: 20 seconds, 200 seconds (5) Evaluation of Performance
(5-1) Evaluation of Irregular Shape
Measurement method For the transferred surface of the substrate, primary irregularities and secondary irregularities were measured with a white light interferometer, and third irregularities were measured with an atomic force microscope (AFM) to calculate the area ratio φs, arithmetic average roughness Ra and average length RSm.

Measurement conditions of white light interferometer
  Measurement instrument: New View 7300 of ZYGO Corporation
  50-times objective lens
  2.0-times eyepiece lens
  Long wavelength cut-off value $\lambda c=13.846155$ μm
  Short wavelength cut-off value $\lambda s=346.155$ nm
Measurement conditions of AFM
  Measurement instrument: Nano Scope III of Veeco Instruments Inc.
  Long wavelength cut-off value $\lambda c=0.0824$ μm (5-2) Evaluation of Fluorine Atom Content
* Measurement method The wide-band spectrum of the surface of the substrate was analyzed by using an X-ray photoelectron spectroscope to measure the amounts of elements existent on the surface so as to calculate the ratio (F/C) of the fluorine atom and the carbon atom.
Measurement instrument
K-Alpha of Thermo Fisher Scientific Inc.

(5-3) Evaluation of Liquid-Repellency-Drop-Off Properties
* Test method

4 μL of a real liquid was dropped on the surface of the substrate to take a picture of a droplet shape from the side. The contact angle was measured by image analysis.

The surface of the substrate was gradually inclined to take an inclination angle when the droplet dropped off as a drop-off angle.
Real liquid
  Water
  Soy sauce
  Sauce
  cooking oil
measurement instrument: Drop Master 700 of Kyowa Interface Science Co., Ltd.
evaluation criterion When the contact angle is 130° or more, it is judged that the molded body has liquid repellency. When the drop-off angle is 20° or less, it is judged that the molded body has drop-off properties.

(5-4) Evaluation of Liquid Repellent Durability
* Test method

A 40 μL droplet of the real liquid was dropped on the substrate inclined at 25° an arbitrary number of times to contaminate the surface of the substrate.

The contact angle of the real liquid with the surface of the contaminated substrate was measured (amount of a droplet: 4 μL).
Real liquid
  Sauce
  Cooking oil
Measurement instrument: manufactured by Kyowa Interface Science Co., Ltd.
Evaluation criterion By comparing the contact angle θ0 when the number of dropping times is 0 and the contact angle θ100 when the number of dropping times is 100 from the relationship between the number of dropping times and the contact angle, when $\theta 100/\theta 0 \geq 0.9$, it is judged that the molded body has liquid repellent durability.

The evaluation results are shown in Table 1.

TABLE 1

| | | | | Ex. 1 *1 | Ex. 2 *2 | Ex. 3 *3 | Comp. Ex. 1 *1 | Comp. Ex. 2 *2 | Comp. Ex. 3 *3 |
|---|---|---|---|---|---|---|---|---|---|
| Molding conditions | Ni stamper | *1 | | *4 | none | *4 | *4 | none | *4 |
| | | *2 | | none | *5 | *6 | none | *5 | *6 |
| | *7 | Treatment time | | 20 s | 20 s | 200 s | 0 s | 0 s | 0 s |
| Evaluation results | Irregular shape | *1 | φs | 0.2 | — | 0.2 | 0.2 | — | 0.2 |
| | | *2 | Ra/RSm | — | $264 \times 10^{-3}$ | $92 \times 10^{-3}$ | — | $264 \times 10^{-3}$ | $92 \times 10^{-3}$ |
| | | *8 | Ra/RSm | $7.5 \times 10^{-3}$ | $7.5 \times 10^{-3}$ | $288 \times 10^{-3}$ | $2.5 \times 10^{-3}$ | $2.5 \times 10^{-3}$ | $2.5 \times 10^{-3}$ |
| | *9 | | F/C | 74% | 74% | 78% | 0% | 0% | 0% |
| | Liquid repellency | Contact angle | Water | ○ | ○ | ○ | ○ | ○ | ○ |
| | | | Soy sauce | ○ | ○ | ○ | X | ○ | X |
| | | | Sauce | ○ | ○ | ○ | X | ○ | X |
| | | | Cooking oil | X | X | ○ | X | X | X |
| | Drop-off properties | Drop-off angle | Water | ○ | ○ | ○ | ○ | ○ | ○ |
| | | | Soy sauce | ○ | ○ | ○ | X | X | X |
| | | | Sauce | ○ | | | X | X | X |
| | | | Cooking oil | X | X | ○ | X | X | X |
| | Liquid repellent durability | | Sauce | ○ | ○ | ○ | X | X | X |
| | | | Cooking oil | X | X | ○ | X | X | X |
| | Overall evaluation | | | ○ | ○ | ◎ | X | X | X |

*1: Primary irregularities,
*2: Secondary irregularities,
*3: Hierarchical irregularities,
*4: line & space,
*5: wet etching,
*6: shot blast,
*7: Plasma treatment,
*8: Tertiary irregularities,
*9: Fluorine content

EXPLANATION OF REFERENCE NUMERALS

100: rough surface
160: primary irregularities
160a: concave portion
160b: convex portion
165: secondary irregularities
170: droplet

The invention claimed is:

1. A packaging material having the form of a bottle, cap or spout to contain a liquid substance, wherein:
   the packaging material having said form has a surface that comes in contact with said liquid substance, said surface being a non-fluororesin surface comprising a polyolefin or a polyester;
   said non-fluororesin surface is at least partly a rough surface that has a primary irregular surface; and
   a fluorine atom is bonded to a molecular chain of the non-fluororesin forming said rough surface by etching the non-fluororesin surface with a fluorine plasma.

2. The packaging material according to claim 1, wherein the rough surface has the primary irregular surface (1) and a secondary irregular surface (2) which is finer than the primary irregular surface (1) and which is formed within the primary irregular surface (1), and
   a fluorine atom is bonded to a molecular chain at the non-fluororesin forming the secondary irregular surface.

3. The packaging material according to claim 2, wherein a much finer tertiary irregular surface (3) is formed within the secondary irregular surface (2), and
   a fluorine atom is bonded to a molecular chain at the non-fluororesin forming the tertiary irregular surface.

4. The packaging material according to claim 1, wherein when a droplet is dropped on the rough surface, an area ratio $\phi_s$ represented by a projection area of a solid-liquid interface per unit area is 0.05 to 0.8.

5. The packaging material according to claim 1, wherein the rough surface has a rectangular irregular structure.

6. The packaging material according to claim 1, wherein when an arithmetic average roughness corresponding to an amplitude of an irregular structure forming the rough surface is represented by Ra and an average length of a 1/2 pitch ($R_0$) of an irregular structure is represented by RSm, the rough surface (ii) satisfies $Ra/RSm \geq 50 \times 10^{-3}$.

7. The packaging material according to claim 1 which is adapted to discharge a liquid substance.

* * * * *